US008559399B2

(12) United States Patent
Inoue et al.

(10) Patent No.: US 8,559,399 B2
(45) Date of Patent: Oct. 15, 2013

(54) SEMICONDUCTOR DEVICE, WIRELESS TERMINAL DEVICE, AND WIRELESS COMMUNICATION SYSTEM

(75) Inventors: Kaoru Inoue, Tokyo (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 13/043,737

(22) Filed: Mar. 9, 2011

(65) Prior Publication Data

US 2011/0317669 A1  Dec. 29, 2011

(30) Foreign Application Priority Data

Jun. 24, 2010  (JP) ................................. 2010-143662

(51) Int. Cl.
*H04W 4/00* (2009.01)
(52) U.S. Cl.
USPC ............................ 370/332; 370/328; 370/331
(58) Field of Classification Search
None
See application file for complete search history.

(56) References Cited

U.S. PATENT DOCUMENTS

| 2002/0137514 | A1 | 9/2002 | Mitsugi et al. | |
| 2007/0230403 | A1* | 10/2007 | Douglas et al. | 370/334 |
| 2008/0031197 | A1* | 2/2008 | Wang et al. | 370/331 |
| 2008/0171553 | A1 | 7/2008 | Ren et al. | |
| 2010/0240356 | A1* | 9/2010 | Lee et al. | 455/422.1 |
| 2011/0177819 | A1* | 7/2011 | Kitahara | 455/436 |

FOREIGN PATENT DOCUMENTS

| JP | 2002-084226 | 3/2002 |
| JP | 2008-295014 | 12/2008 |

OTHER PUBLICATIONS

WO 2010/035843: Kitahara, Minako, "Wireless Communication Terminal and Wireless Communciation Method" Jan. 4, 2010.*

* cited by examiner

*Primary Examiner* — Yemane Mesfin
*Assistant Examiner* — Diane Lo
(74) *Attorney, Agent, or Firm* — White & Case LLP

(57) ABSTRACT

According to an embodiment, a semiconductor device includes a wireless station selection unit configured to select a connection destination wireless station from among a plurality of wireless stations. The wireless station selection unit includes a power calculation processing unit, a storage unit, a table update processing unit, and a power variation range detection processing unit. The power calculation processing unit is configured to calculate power of each receiving signal from each of the wireless stations. The storage unit is configured to store a table, and the power of each receiving signal equal to or more than a predetermined threshold is recorded in the table in association with each of the wireless stations. The table update processing unit is configured to update the table at a predetermined timing interval. The power variation range detection processing unit is configured to detect a variation range of the power for each of the wireless stations with reference to the table and configured to set the wireless station in which the variation range is within a predetermined range as a priority candidate of the connection destination wireless station.

20 Claims, 17 Drawing Sheets

SEMICONDUCTOR DEVICE, WIRELESS TERMINAL DEVICE, AND WIRELESS COMMUNICATION SYSTEM

CROSS REFERENCE TO RELATED APPLICATIONS

This application is based upon and claims the benefit of priority from the prior Japanese Patent Application No. 2010-143662 filed on Jun. 24, 2010 in Japan, the entire contents of which are incorporated herein by reference.

FIELD

Embodiments described herein relate generally to a semiconductor device, a wireless terminal device, and a wireless communication system.

BACKGROUND

In recent years, by installing a relay station in a vehicle such as a railway train or a bus, services that allow a passenger to perform wireless communication with the relay station using a wireless terminal and use a mobile wireless communication system such as a mobile worldwide interoperability for microwave access (WiMAX) have been provided.

Generally, in the mobile wireless communication system, the wireless terminal calculates a long-term average value of receiving power of a radio signal from each base station and the relay station at a regular time interval, selects one having a largest long-term average value as a connection destination base station, and is wirelessly connected to the selected base station or relay station.

In order to prevent the wireless terminal inside the vehicle from unnecessarily performing the hand-off process, the wireless terminal is preferably continuously connected to the relay station inside the vehicle. However, when the vehicle is moving, the radio signal from the base station outside the vehicle enters the vehicle through a window, and the wireless terminal may receive the radio signal with the good quality (power). In this case, the wireless terminal attempts to connect with the base station outside the vehicle other than the relay station inside the vehicle.

That is, as the vehicle moves, the wireless terminal is connected with the base station outside the vehicle that temporarily has the good quality or the relay station inside the vehicle. Thus, the hand-off (switching) process in which the wireless terminal performs with a connection destination base station may unnecessarily increase. Since the wireless terminal cannot perform data communication during the hand-off process, if the hand-off process increases, there is a problem in that communication efficiency deteriorates. Further, if the hand-off process increases, there is also a problem in that power consumption of the wireless terminal increases.

DETAILED DESCRIPTION

According to an embodiment, a semiconductor device includes a wireless station selection unit configured to select a connection destination wireless station from among a plurality of wireless stations. The wireless station selection unit includes a power calculation processing unit, a storage unit, a table update processing unit, and a power variation range detection processing unit. The power calculation processing unit is configured to calculate power of each receiving signal from each of the wireless stations. The storage unit is configured to store a table, and the power of each receiving signal equal to or more than a predetermined threshold is recorded in the table in association with each of the wireless stations. The table update processing unit is configured to update the table at a predetermined timing interval. The power variation range detection processing unit is configured to detect a variation range of the power for each of the wireless stations with reference to the table and configured to set the wireless station in which the variation range is within a predetermined range as a priority candidate of the connection destination wireless station.

Hereinafter, exemplary embodiments of the present invention will be described with reference to the accompanying drawings. The present invention is not limited to the exemplary embodiments.

One of features of the present embodiment is that power of each receiving signal from each base station and a relay station is calculated, and a base station or a relay station, in which power is equal to or more than a threshold and a variation range of power is within a predetermined range, is selected as a priority candidate of a connection destination base station.

In the present embodiment, a description will be made in connection with a case in which a down-link orthogonal frequency division multiplex (OFDM) and up-link orthogonal frequency division multiple access/time division duplex (OFDMA/TDD) system, such as IEEE 802.16e standard, called a mobile WiMAX, is applied as an example.

Figure 1:
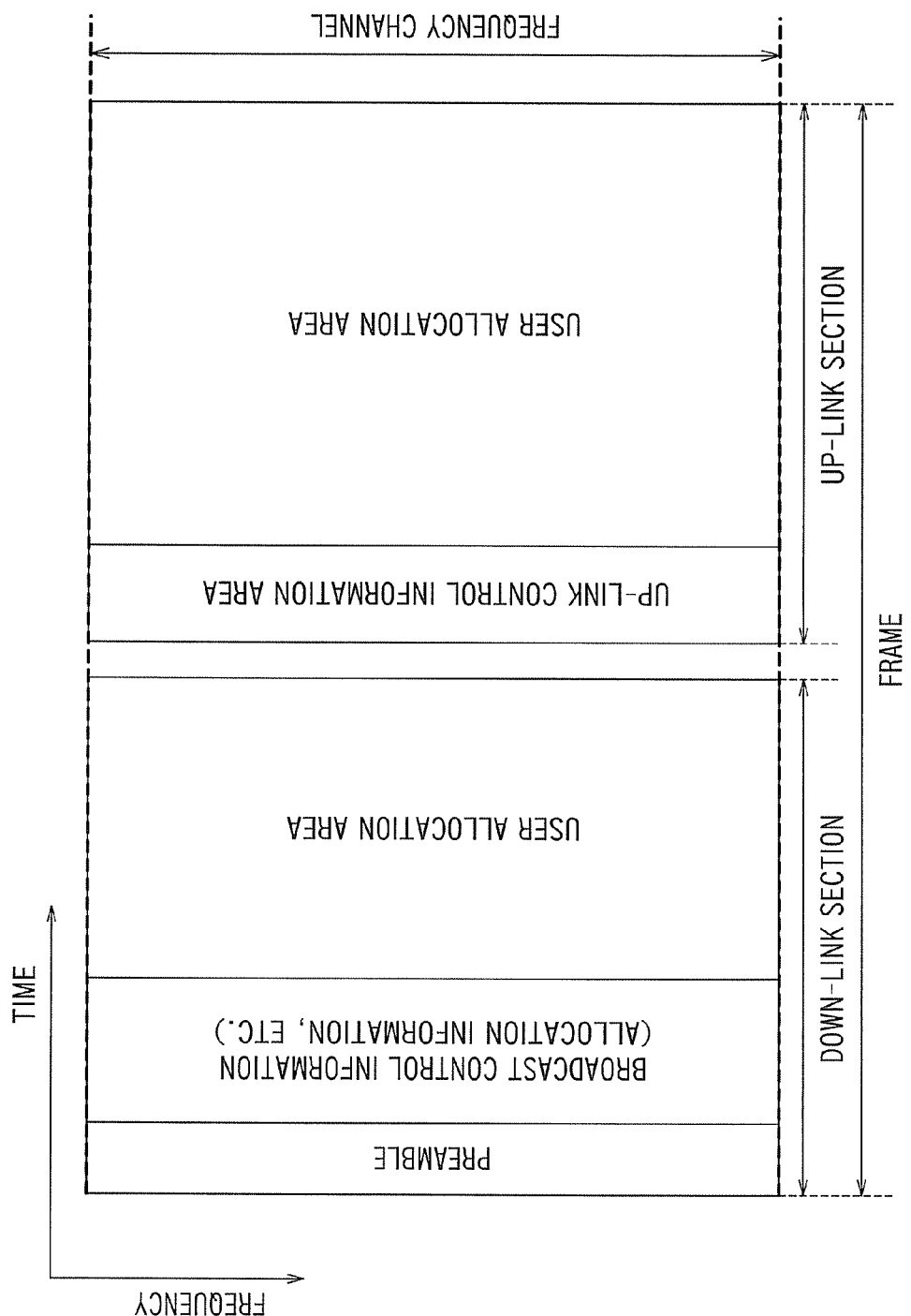
FIG. 1 is a diagram illustrating a frame configuration of a wireless communication system according to an exemplary embodiment.

FIG. 1 illustrates a frame configuration of the system. Since the system is a TDD system, both a down-link section and an up-link section are present in one frame. A pilot signal generated from a known bit sequence called a preamble is included in a head of a frame (a head of the down-link section). The wireless terminal performs a frame synchronization process using the preamble section.

A communication standard defines the preamble as a known bit sequence. The wireless terminal retains time waveform data obtained by performing the inverse fast Fourier transform on the known bit sequence. Further, M different bit patterns (M is an integer equal to or more than 2) are present in the preamble. Each base station repetitively transmits the same preamble using any one of the bit patterns. The preambles of different patterns are allocated to the respective base stations so that a pattern of the preamble allocated to a specific base station can be distinguished from those of neighboring base stations.

By acquiring frame synchronization through the preamble section of the down-link section of the frame and receiving a subsequent broadcast control information section, the wireless terminal specifies the base station and recognizes a user allocation area section that can be used by the wireless terminal for the up-link and the down-link.

As described above, the preamble of the different pattern is used for each of the neighboring base stations. Thus, the wireless terminal can detect the base stations that are present around it, by calculating cross-correlation power between the received time sample data and the time waveform data of each preamble pattern retained in the wireless terminal and investigating a preamble pattern having a strong correlation.

Figure 2:
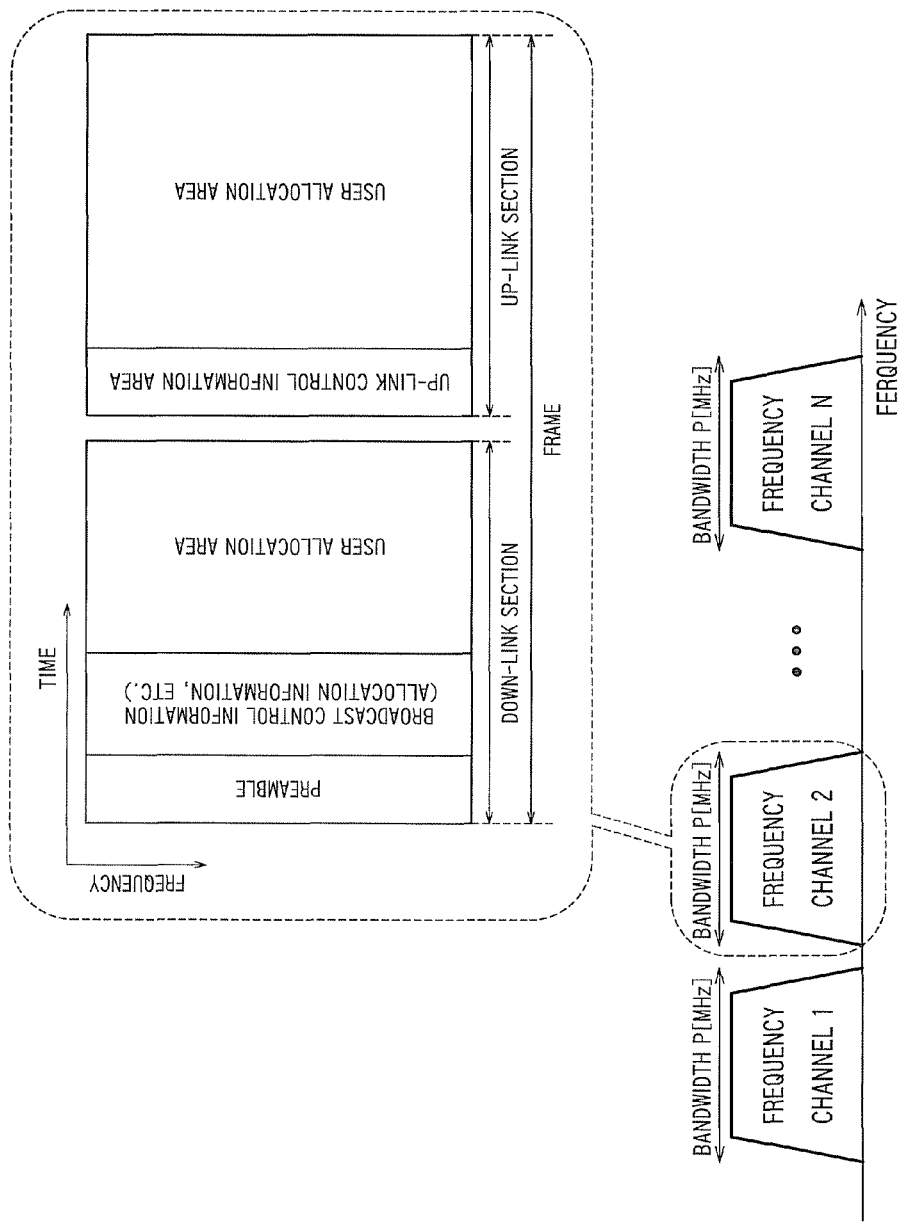
FIG. 2 is a diagram illustrating a frequency channel according to an exemplary embodiment.
Figure 3:
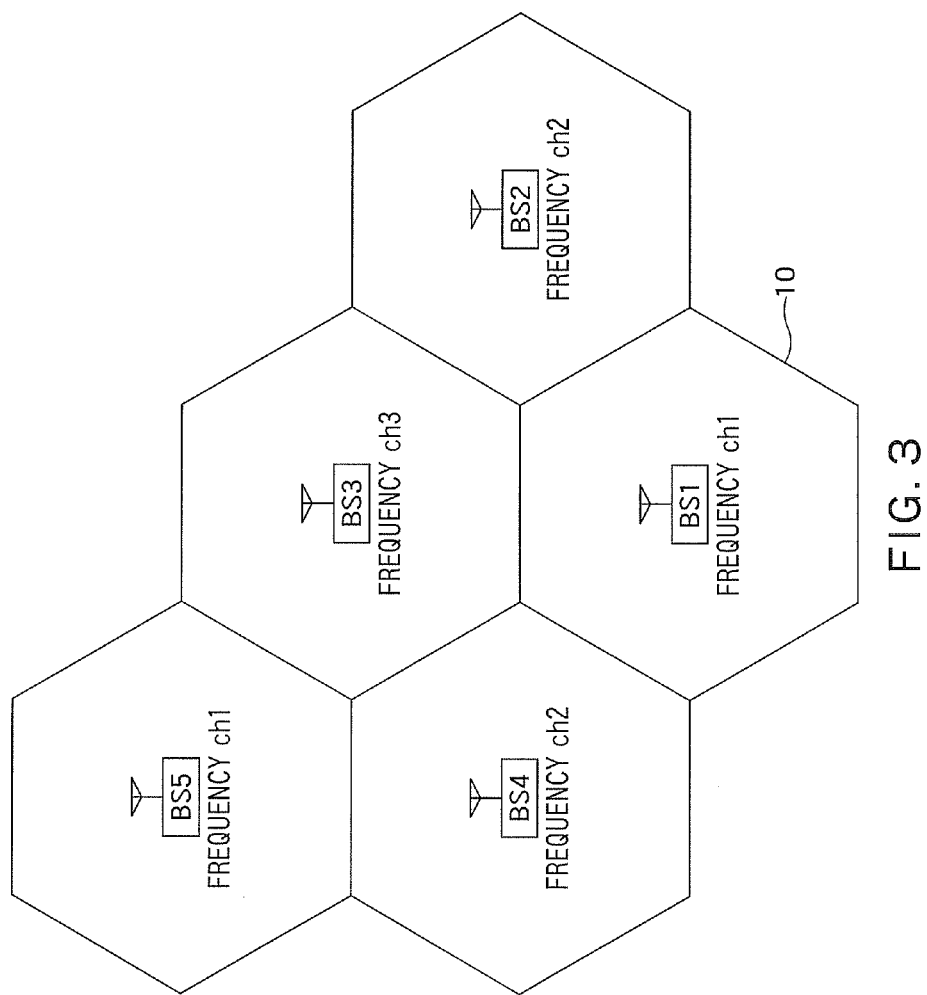
FIG. 3 is a diagram illustrating allocation of a frequency channel to each base station according to an exemplary embodiment.

As illustrated in FIG. 2, a plurality of frequency channels having a specific bandwidth P [MHz] is present in the system. A communication frequency band is allocated so that each base station can uses any one of the frequency channels. If the neighboring base stations use the same frequency channel, interference increases in a boundary (a cell edge) of a communication area between the base stations, so that the communication quality deteriorates. For this reason, the frequency channel is allocated to each base station so that the neighboring base stations cannot use the same frequency channel. For example, FIG. 3 illustrates an example in which 3 frequency channels are used so that frequencies between the neighboring base stations can become different. For example, a frequency channel 1 is used in a communication area 10 of a base station BS1, and a frequency channel 2 is used in a communication area 10 of a base station BS2 adjacent to the base station 1.

Figure 4:
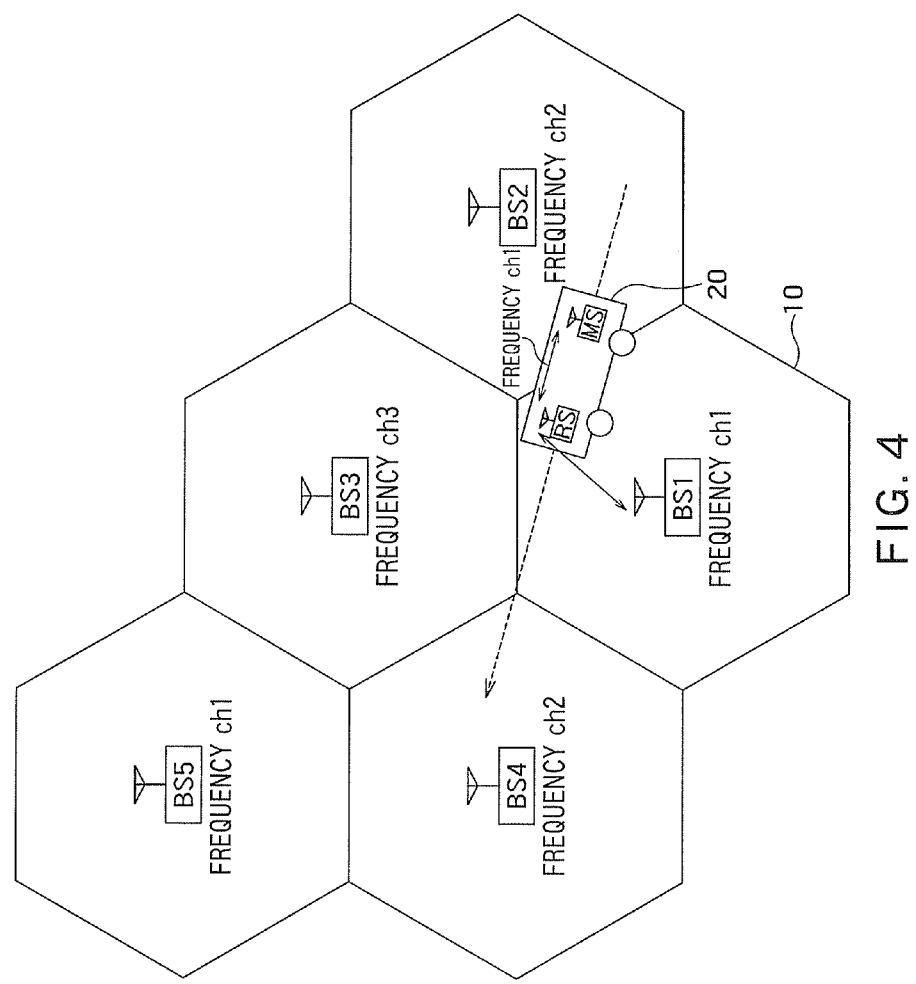
FIG. 4 is a diagram illustrating a wireless communication system according to an exemplary embodiment.

FIG. 4 is a diagram illustrating a wireless communication system according to an exemplary embodiment. The wireless communication system includes a plurality of base stations (wireless stations) BS1 to BS5 (also referred to as "BS"), a relay station (a wireless station) RS, and a wireless terminal MS. FIG. 4 illustrates an aspect in which a vehicle (a mobile body) 20 such as a railway train to which the relay station RS is mounted moves. The wireless terminal MS is connected with one connection destination base station (a connection destination wireless station) selected from among the plurality of base stations BS1 to BS5 and the relay station RS, and performs wireless communication. The relay station RS is configured to relay wireless communication between the wireless terminal MS and the base station BS. The relay station RS has transmitting power smaller than the base station BS so that only the inside of the vehicle 20 can be set as a communication area.

In FIG. 4, a frequency channel that the relay station RS uses for communication with the wireless terminal MS inside the vehicle 20 is a frequency channel 1. Further, a frequency channel that the relay station RS uses for communication with the base station BS is handed off to a frequency channel that is used by a neighboring base station BS, as the vehicle 20 moves.

Figure 5:
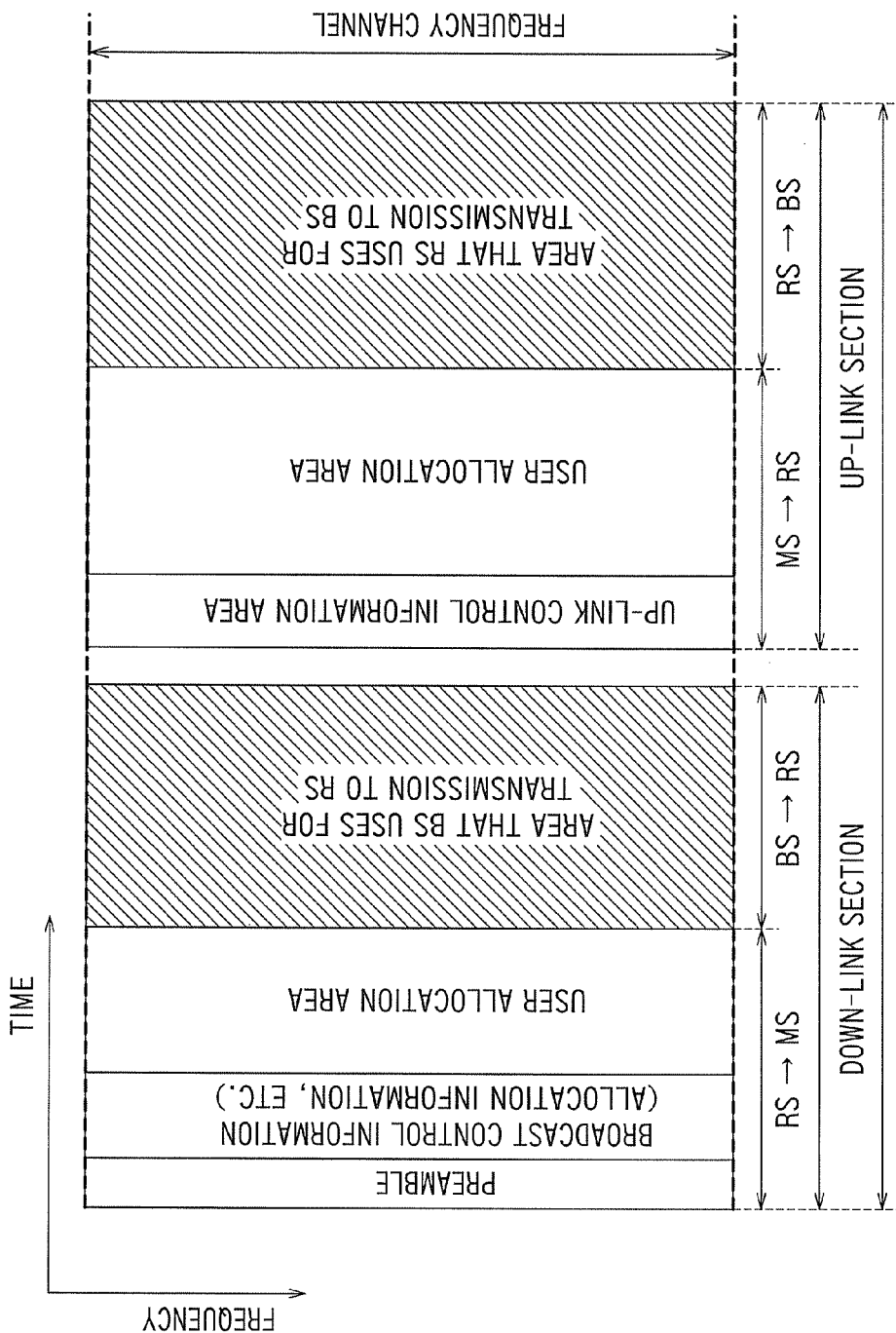
FIG. 5 is a diagram illustrating a frame configuration when communication between a relay station RS and a wireless terminal MS and communication between a relay station RS and a base station BS are performed in the same frequency channel according to an exemplary embodiment.

Here, communication between the relay station RS and the wireless terminal MS needs to be separated from communication between the relay station RS and the base station BS so that time sections are not superimposed. For example, in the case of using the same frequency channel 1 as illustrated in FIG. 4, as illustrated in FIG. 5, communication is performed such that a down-link section (the relay station RS→the wireless terminal MS or the base station BS→the relay station RS) is temporally separated from a up-link section (the wireless terminal MS→the relay station RS or the relay station RS→the base station BS). At this time, the wireless terminal MS does not distinguish whether the other party that performs communication is the base station BS or the relay station RS. That is, at a point of view of the wireless terminal MS, the relay station RS looks like the base station BS, and the communication process of the wireless terminal MS side when the wireless terminal MS is connected with the relay station RS is not different from when the wireless terminal MS is connected with the base station BS.

Next, another frame configuration applicable to the system will be described.

Figure 6:
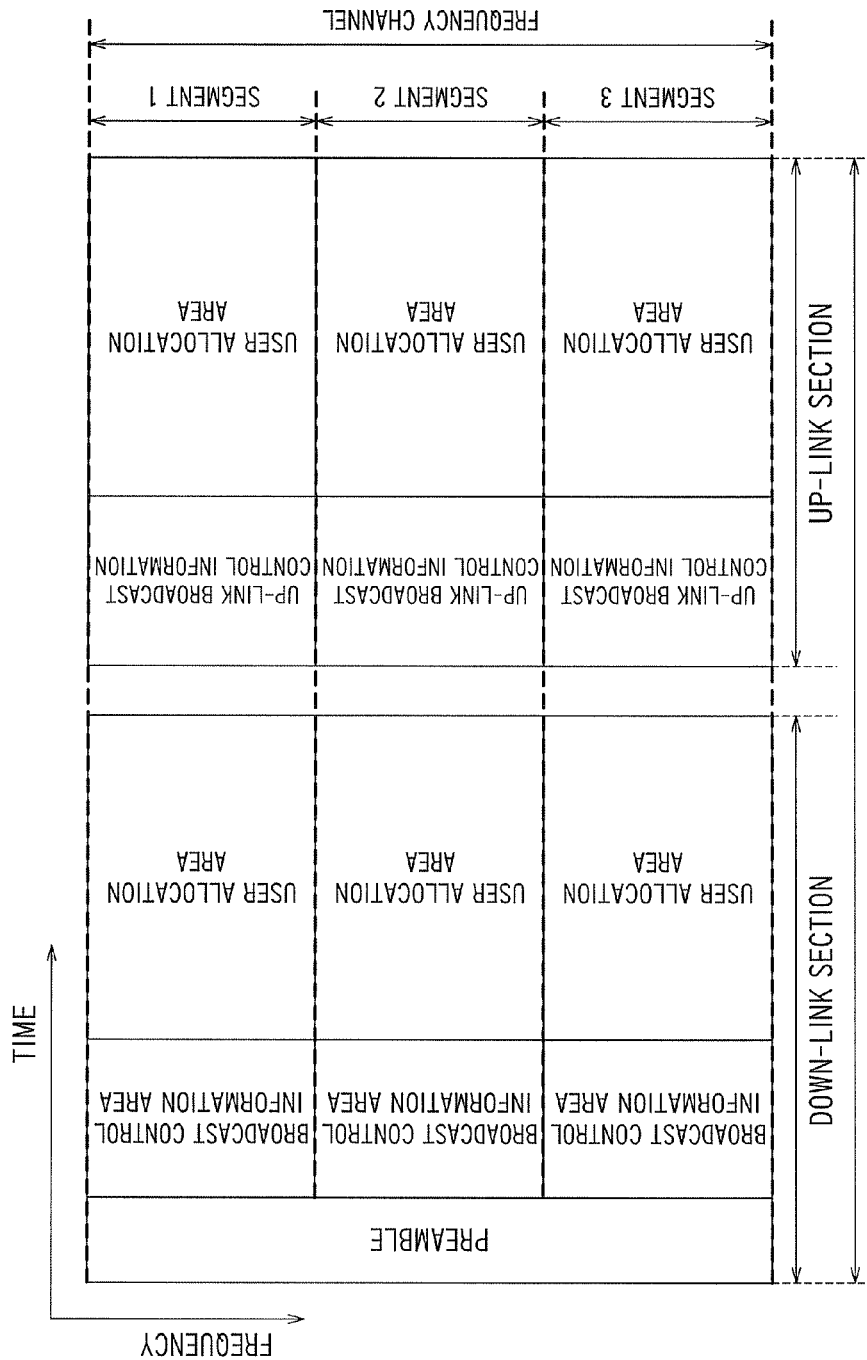
FIG. 6 is a diagram illustrating a frame configuration in which one frequency channel is divided into 3 frequency segments according to an exemplary embodiment.
Figure 7:
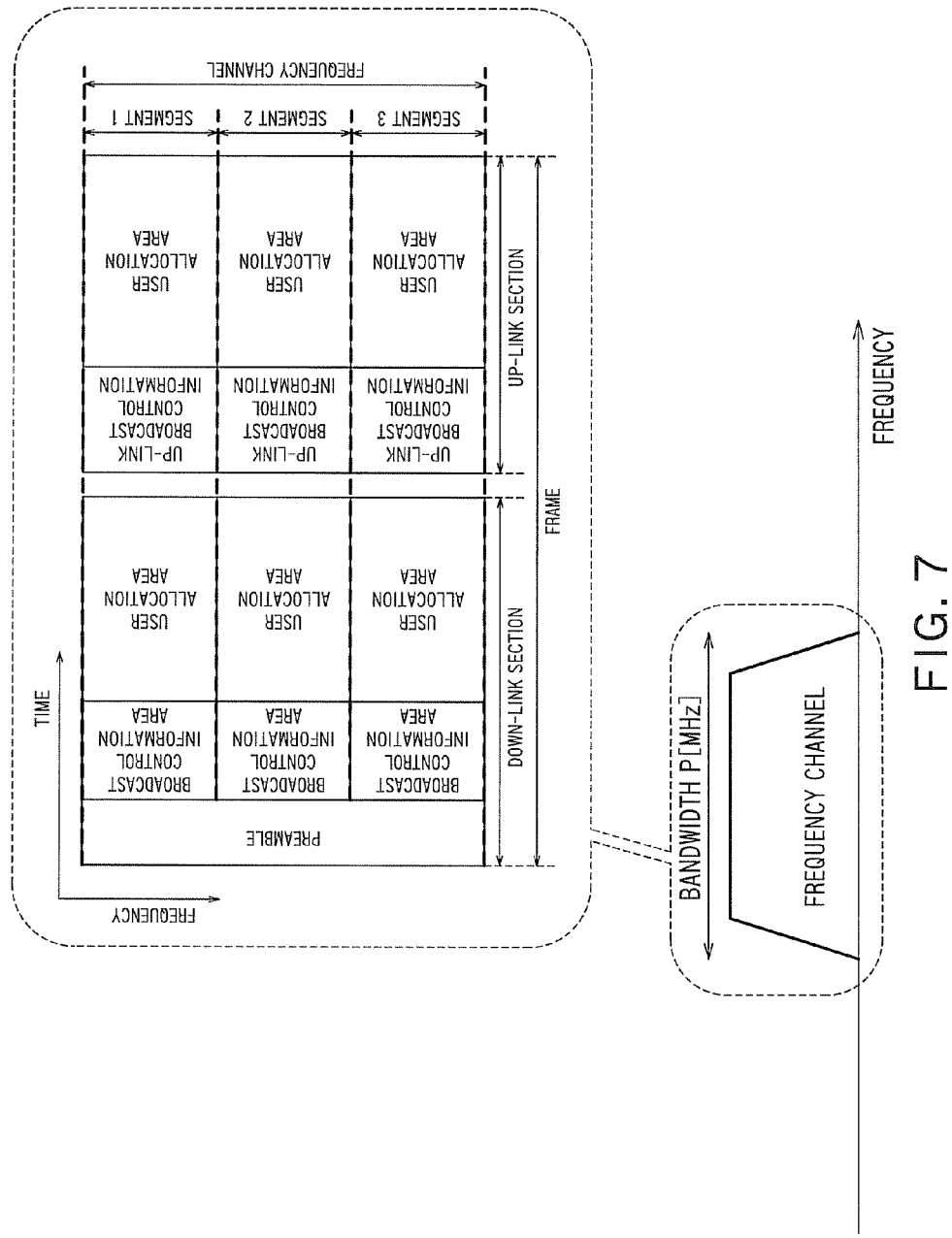
FIG. 7 is a diagram illustrating a relationship between a frequency channel and a segment according to an exemplary embodiment.

FIG. 6 illustrates a frame configuration in which one frequency channel is divided into 3 frequency segments. In this setting, as illustrated in FIG. 7, 3 independent communications can be performed within the same frequency channel by using a segment 1 to a segment 3.

Figure 8:
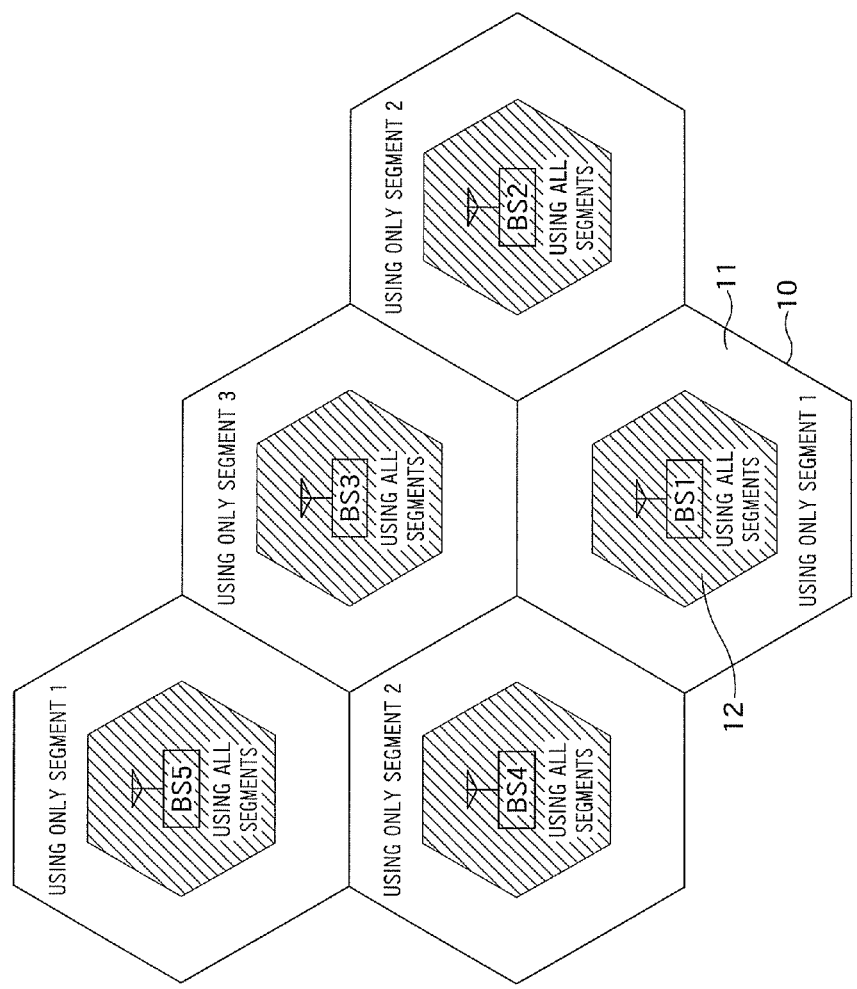
FIG. 8 is a diagram illustrating segment allocation to each base station according to an exemplary embodiment.

In the case of performing segmentation, as illustrated in FIG. 8, in an area 11 near the cell edge between directly neighboring base stations, in order to avoid interference from the neighboring base station BS, an operation is performed so that the same segment is not used. Further, in an area 12 near the base station BS (that is, an area other than the area 11 near the cell edge), since interference from the neighboring base station is small, an operation is performed using all segments.

Figure 9:
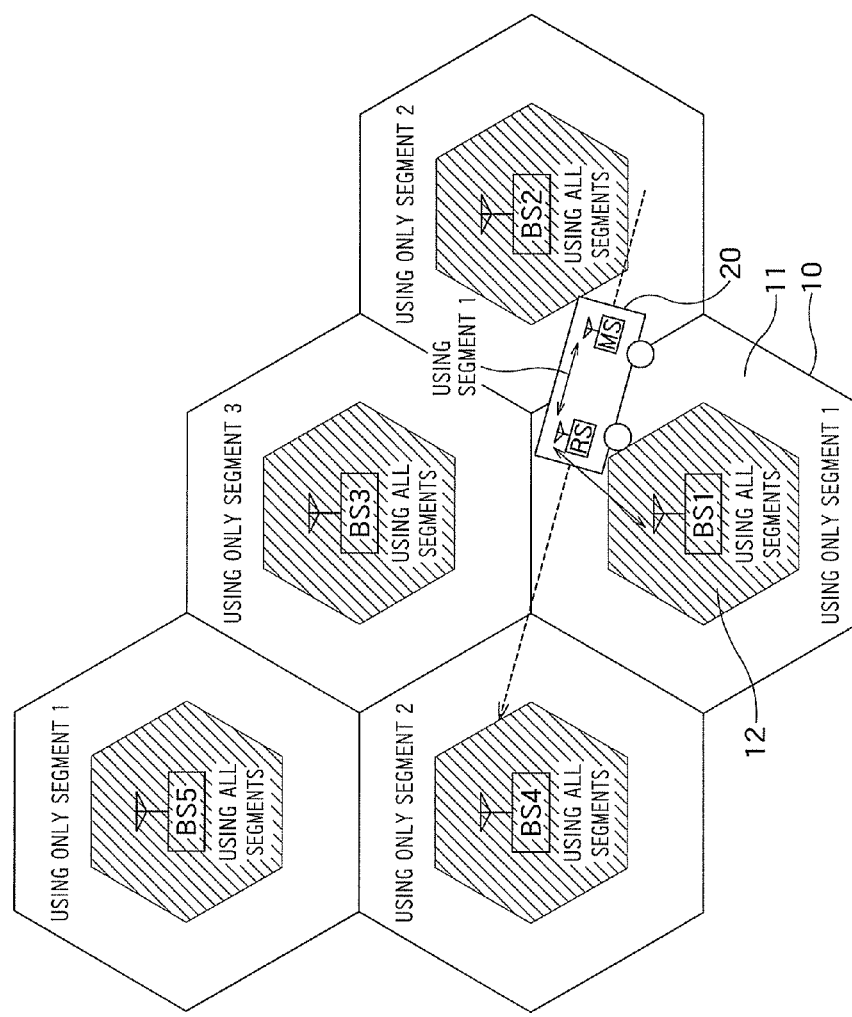
FIG. 9 is a diagram illustrating a wireless communication system in which segmentation has been performed according to an exemplary embodiment.
Figure 10:
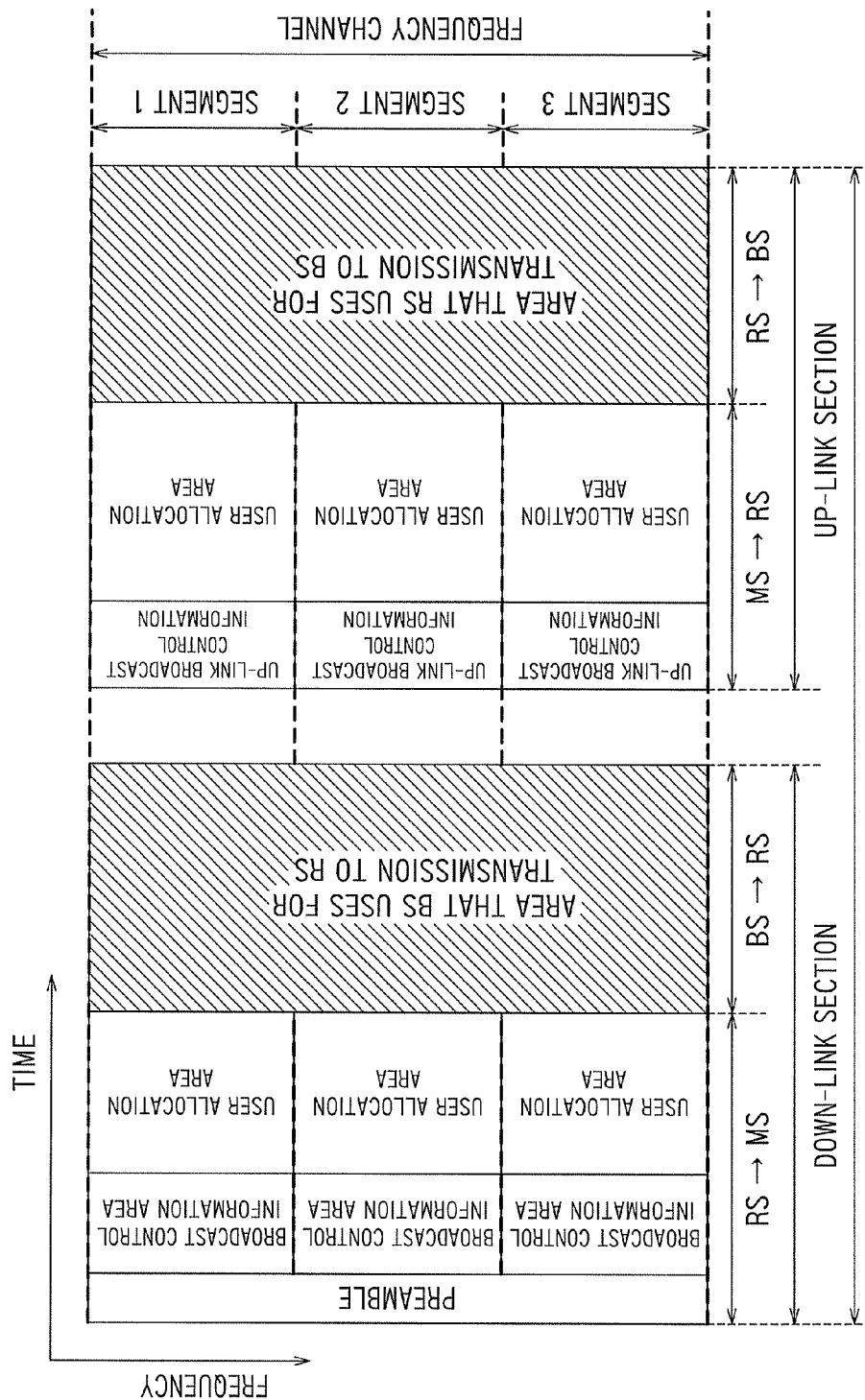
FIG. 10 is a diagram illustrating a frame configuration when in a segmentation operation, communication between a relay station RS and a wireless terminal MS and communication between a relay station RS and a base station BS are performed in the same frequency channel according to an exemplary embodiment.

FIG. 9 illustrates a wireless communication system in which segmentation has been performed according to an exemplary embodiment. The same components as in FIG. 4 are denoted by the same reference numerals, and a description thereof will not be repeated. Under the condition in which segmentation has been performed, the relay station RS mounted to the inside of the vehicle 20 communicates with the wireless terminal MS using any one of the segments. In the example of FIG. 9, the relay station RS communicates with the wireless terminal MS using the segment 1. Even in an operation in which segmentation has been performed, communication is similarly performed such that a down-link section (the relay station RS→the wireless terminal MS or the base station BS→the relay station RS) is temporally separated from a up-link section (the wireless terminal MS→the relay station RS or the relay station RS→the base station BS) as illustrated in FIG. 10. Further, even in this case, the wireless terminal MS does not distinguish whether the other party that performs communication is the base station BS or the relay station RS.

The wireless communication MS will be described below.

Figure 11:
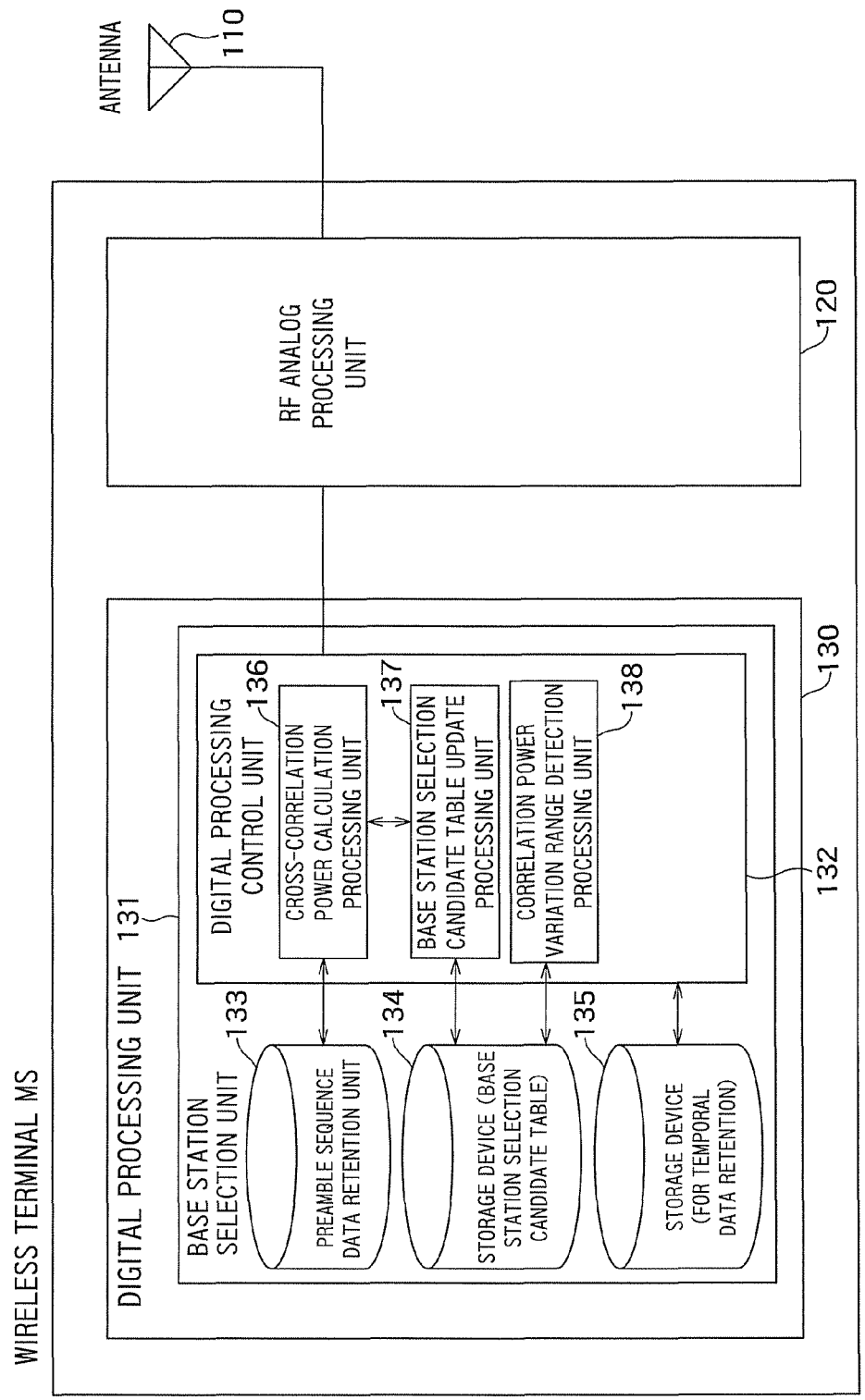
FIG. 11 is a block diagram illustrating a configuration of a wireless terminal MS according to an exemplary embodiment.

FIG. 11 is a block diagram illustrating a configuration of a wireless terminal MS according to an exemplary embodiment.

The wireless terminal MS includes an antenna 110, a radio frequency (RF) analog processing unit (a wireless processing unit) 120, and a digital processing unit (a signal processing unit) 130. The digital processing unit 130 includes a base station selection unit (a wireless station selection unit) 131. The base station selection unit 131 includes a digital processing control unit 132, a preamble sequence data retention unit 133, a storage device (a storage unit) 134 that stores a base station selection candidate table, and a storage device (for temporal data retention) 135. The digital processing control unit 132 includes a cross-correlation power calculation processing unit (a power calculation processing unit) 136, a base station selection candidate table update processing unit (a table update processing unit) 137, and a correlation power variation range detection processing unit (a power variation range detection processing unit) 138.

A radio signal received through the antenna 110 is down-converted to an analog baseband signal through the RF analog processing unit 120. The analog baseband signal is subjected to an analog-to-digital (A/D) conversion process in the RF analog processing unit 120, and data converted to a digital sample is input to the digital processing unit 130. Further, at the time of transmission, a digital sample from the digital processing unit 130 is subjected to a digital-to-analog (D/A) conversion process in the RF analog processing unit 120 and converted into an analog baseband signal. The analog baseband signal is up-converted by the RF analog processing unit 120 and then transmitted through the antenna 110 as a radio signal. That is, the RF analog processing unit 120 transmits or receives the radio signal to or from each of the base station BS and the relay station RS.

The digital processing unit 130 performs a necessary digital signal process as the radio signal is transmitted or received.

The base station selection unit 131 selects a connection destination base station from among the plurality of base stations BS and the relay station RS.

An operation of the base station selection unit 131 will be described below first schematically and then in detail.

The digital processing control unit 132 stores a digital sample of an input receiving signal in the storage device (for temporal data retention) 135.

The cross-correlation power calculation processing unit 136 calculates cross-correlation power on each known preamble data using the digital sample. Each known preamble data (time waveform data) is read out from read only memory (ROM) data stored in the preamble sequence data retention unit 133. Each known preamble data is stored in association with each receiving signal from each of the base station BS and the relay station RS.

As described above, the cross-correlation power calculation processing unit 136 calculates power of each receiving signal from each of the base station BS and the relay station RS.

The cross-correlation power calculation processing unit 136 calculates each cross-correlation power between the receiving signal and a plurality of known preamble data, sets the cross-correlation power equal to or more than a predetermined threshold (a base station selection threshold) as power, and specifies the known preamble data from which the cross-correlation power equal to or more than the base station selection threshold has been obtained.

The storage device 134 is a random access memory (RAM) and stores a base station selection candidate table in which power of each receiving signal equal to or more than the predetermined threshold (the base station selection threshold) is recorded in association with each of the base station BS and the relay station RS.

The base station selection candidate table update processing unit 137 updates the base station selection candidate table at a predetermined timing interval.

The correlation power variation range detection processing unit 138 detects a variation range of power for each of the base station BS and the relay station RS at a predetermined timing interval with reference to the base station selection candidate table and performs an update process on a priority candidate flag in the base station selection candidate table so that the base station BS or the relay station RS in which the variation range is within a predetermined range (a threshold D_threshold) can be set as a priority candidate of the connection destination base station.

The base station selection unit 131 selects the priority candidate having the highest power as the connection destination base station. Further, when the priority candidate is not present, the base station selection unit 131 selects the base station BS or the relay station RS having the highest power as the connection destination base station.

The cross-correlation power calculation processing unit 136, the base station selection candidate table update processing unit 137, and the correlation power variation range detection processing unit 138 in the digital processing control unit 132 may be implemented by hardware including logical circuits or software to be executed on a microprocessor.

An operation of the base station selection unit 131 will be described below in detail.

(1) Calculation of Cross-Correlation Power

The receiving signal and known data of each preamble retained in the wireless terminal MS are defined as follows:

sampling data of the receiving signal after A/D conversion: Rx [j]

known data of the preamble (a preamble number k): Pr[k,i]

Here, "j" is an integer of a range of a window for calculation a correlation. "k" is an integer from 0 to M−1. "i" is an integer from 0 to "the preamble length−1."

The cross-correlation power calculation processing unit 136 of the wireless terminal MS calculates the cross-correlation power (CrossCorr[k,j]) between the receiving signal and the known preamble data (the preamble number k) using the following Equation (1). Here, Rx[j] and Pr[k,i] are complex data, and (a)* represents a complex conjugate of a complex number "a."

$$CrossCorr[k, j] = \left| \left\{ \sum_i Rx[j+i] \cdot (Pr[k,i])^* \right\}^2 \right| \Big/ \left\{ \sum_i (|Rx[j+i]|^2) \right\}^2 \quad (1)$$

A calculation based on Equation (1) will be described in further detail.

Figure 12:
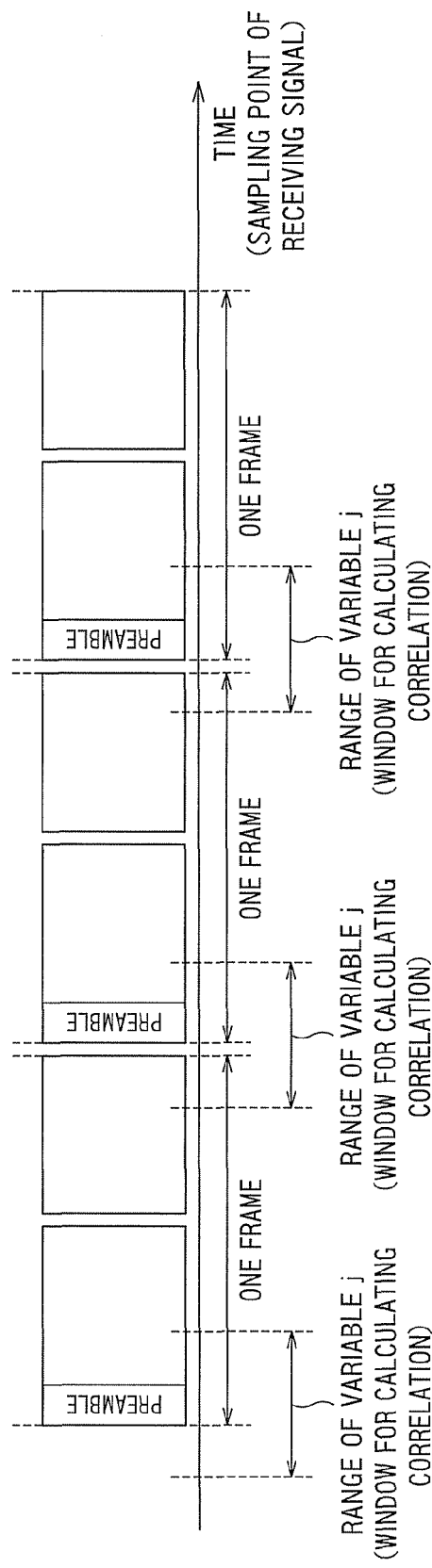
FIG. 12 is a diagram for explaining a calculation of cross-correlation power according to an exemplary embodiment.

As illustrated in FIG. 12, on a receiving signal of a certain one frame, the cross-correlation power CrossCorr[k,j] is calculated by changing a variable j on each preamble number k in the range of the window. Next, a peak value of the cross-correlation power CrossCorr[k,j] is detected on each preamble number k. A peak value equal to or more than the base station selection threshold is detected from M peak values detected as described above. The preamble number in which the maximum peak value has been obtained has the highest correlation with the receiving signal. Further, the peak value equal to or more than the base station selection threshold corresponds to power (an instantaneous value) of the receiving signal from the base station BS or the relay station RS corresponding to the preamble number. Hereinafter, the peak value equal to or more than the base station selection threshold is referred to as a "cross-correlation power peak value."

The cross-correlation power peak value on the receiving signal obtained as described above is averaged for a plurality of frames to calculate a long-term average value of the cross-correlation power peak value.

The long-term average value may be calculated by the following method. First, the cross-correlation power CrossCorr[k,j] of the preamble section included in one frame is calculated. Next, the cross-correlation power CrossCorr[k,j] is averaged on the plurality of frames. Thereafter, a peak value of the averaged cross-correlation power CrossCorr[k,j] is detected. This process is repeated on each preamble number k.

A criterion of an average time length (a first period) will be described. If the movement speed of the vehicle 20 is about 100 km per hour at maximum, the speed of a fading variation included in the receiving signal is about 5 msec (200 Hz) in a frequency band of 2 GHz. For example, 10 times or 20 times thereof, that is, about 50 msec to 100 msec is regarded as the average time length. In the case of a frame of 5 msec that is used, for example, in the mobile WiMAX, averaging is performed for 10 to 20 frames.

(2) Selection of Connection Destination Base Station

Figure 13:
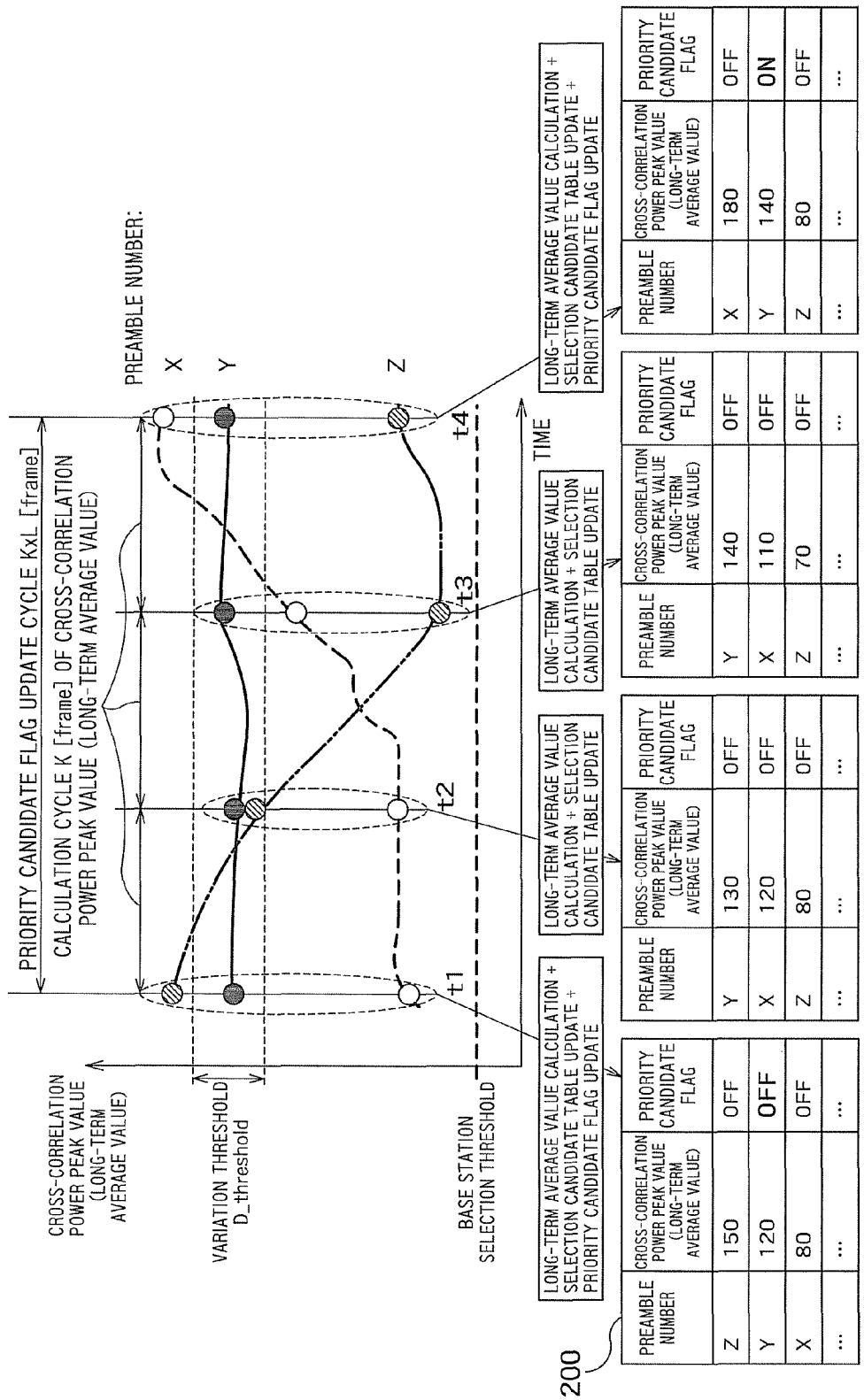
FIG. 13 is a diagram illustrating a temporal change of a long-term average value of a cross-correlation power peak value and a base station selection candidate table according to an exemplary embodiment.

FIG. 13 is a diagram illustrating a temporal change of a long-term average value of a cross-correlation power peak value and a base station selection candidate table according to an exemplary embodiment.

The cross-correlation power calculation processing unit 136 periodically calculates long-term average values of cross-correlation power peak values of all preamble numbers with a cycle of K frames (K is a positive integer).

FIG. 13 illustrates an aspect in which the calculated long-term average values of the cross-correlation power peak values of the receiving signal received by the wireless terminal MS from the base stations BS and the relay station RS that correspond to the preambles X, Y, and Z vary during a time t1 to a time t4 as time elapses. A description of a long-term average value of a cross-correlation power peak value less than the base station threshold is omitted.

Here, it is assumed that the wireless terminal MS is present inside the vehicle 20, the two base stations BS corresponding to the preamble numbers X and Y are present outside the vehicle 20, and the relay station RS corresponding to the preamble number Y is installed inside the vehicle 20. Further, it is assumed that the vehicle 20 is moving. At this time, as illustrated in FIG. 13, variation ranges of the long-term average values of the cross-correlation power peak values of the preamble numbers X and Z are large, but a variation range of the long-term average value of the cross-correlation power peak value of the preamble number Y is small.

The base station selection candidate table update processing unit 137 updates the long-term average value of the cross-correlation power peak value recorded in the base station selection candidate table 200 at each of the time t1 to the time t4 in FIG. 13. The long-term average value of the cross-correlation power peak value exceeding the base station selection threshold and the preamble number corresponding thereto are recorded in the base station selection candidate table 200 in descending order of the long-term average value.

A priority candidate flag is disposed in the base station selection candidate table 200. All of the priority candidate flags of the base station selection candidate table 200 are OFF from the time t1 to the time t3. At the time t4, the correlation power variation range detection processing unit 138 changes the priority candidate flag state of the preamble number Y, in which the variation range of the long-term average value of the cross-correlation power peak values for four samples from the time t1 to the time t4 is within the threshold D_threshold, to ON. In the example of FIG. 13, the threshold D_threshold is 20. Since the variation ranges of the long-term average values of the cross-correlation power peak values of the preamble numbers X and Z are not within the threshold D_threshold, the priority candidate flag states do not change.

A cycle for updating the priority candidate flag (a second period) is generally longer than a cycle for calculating the long-term average value of the cross-correlation power peak value, and, in the example of FIG. 13, the cycle for updating the priority candidate flag is L times (L is a positive integer) of a cycle (K frames) for calculating the long-term average value of the cross-correlation power peak value. Specifically, a cycle K×L for updating the state of the priority candidate flag is about 20 to 40 times (that is, 1 to 4 sec) of an average time length (the first period) in which the long-term average value has been calculated.

The wireless terminal MS decides a hand-off destination base station or selects a base station at the time of communication start with reference to the base station selection candidate table 200. In the example of FIG. 13, the wireless terminal MS selects the relay station RS corresponding to the preamble number Y in which the priority candidate flag is ON when selecting the connection destination base station after the time t4.

Figure 14:
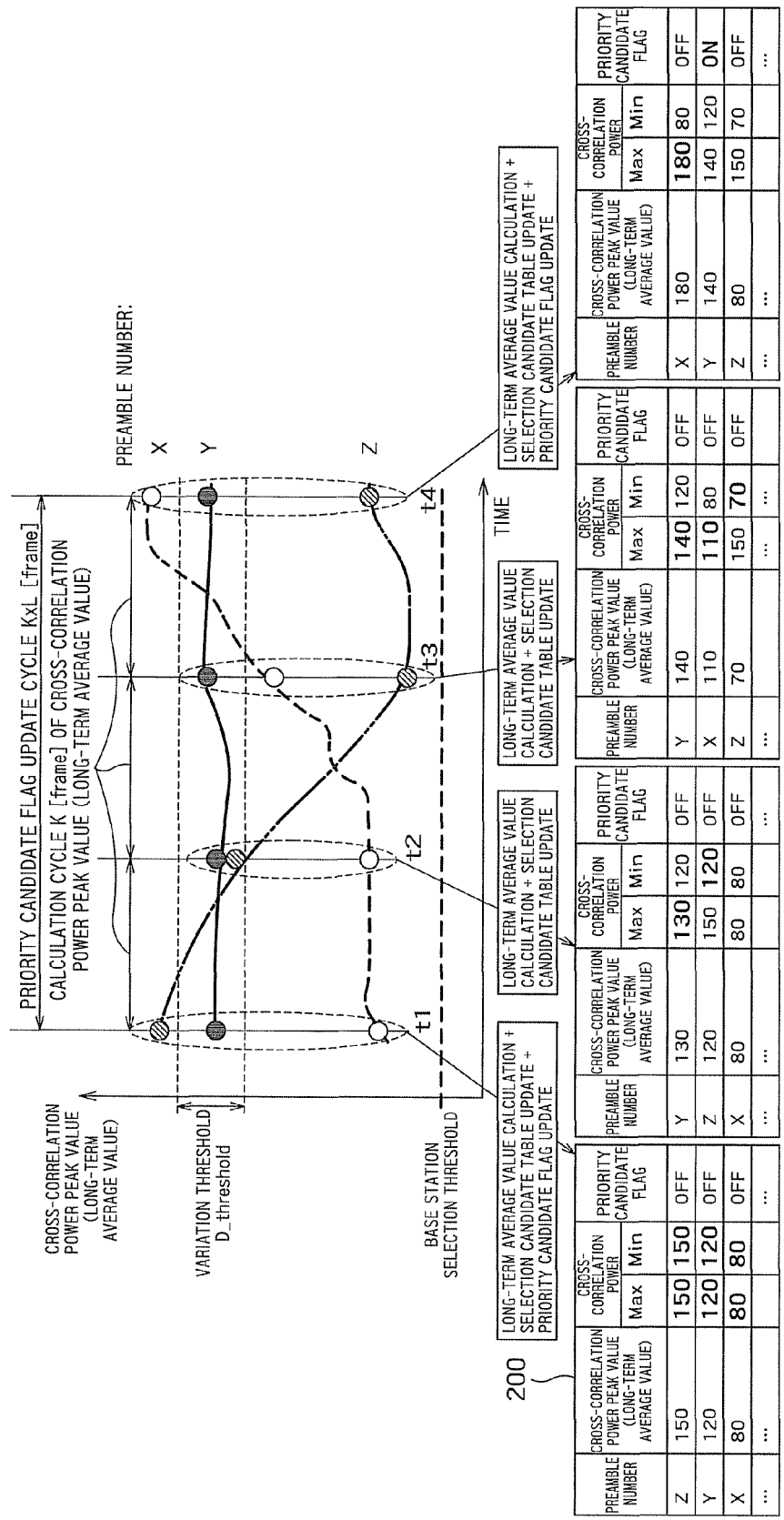
FIG. 14 is a diagram illustrating a base station selection candidate table in which a max value and a min value of a long-term average value of a cross-correlation power peak value are recorded, according to an exemplary embodiment.

Detection on whether or not the variation range of the long-term average value of the cross-correlation power peak value is within the predetermined threshold D_threshold is performed, for example, as follows. That is, variables for storing a max (maximum) value and a min (minimum) value on a memory on each preamble number may be prepared, the variables are sequentially updated at each time when the long-term average value of the cross-correlation power peak value may be calculated, and the variation range may be detected by investigating the difference between the max value and the min value. For example, as illustrated in FIG. 14, the max value and the min value of the cross-correlation power may be recorded in the base station selection candidate table. In this case, the max value and the min value are reset at the time t4 after the priority candidate flag is updated.

Figure 15:
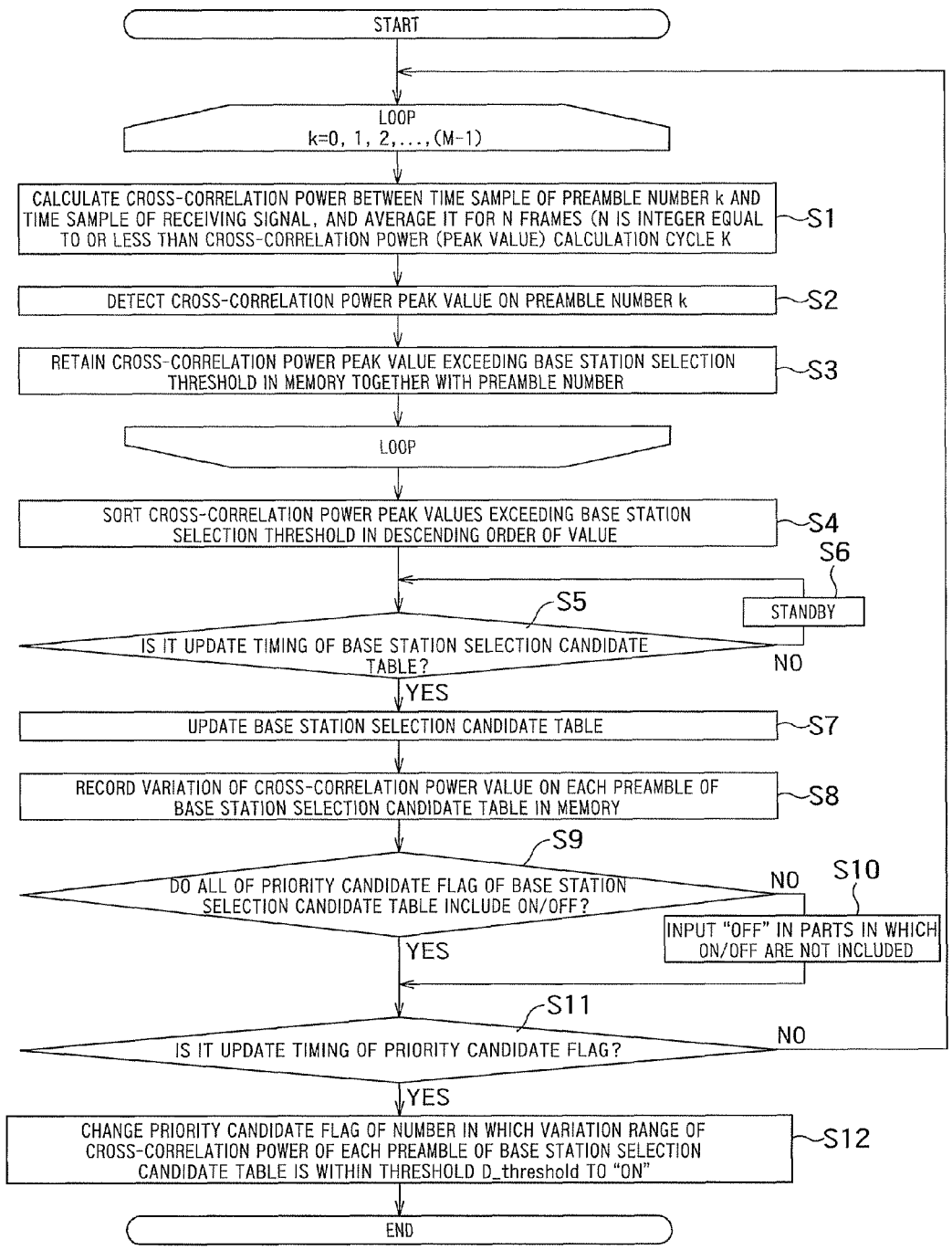
FIG. 15 is a flowchart illustrating a process of deciding a priority candidate of a connection destination base station according to an exemplary embodiment.

FIG. 15 is a flowchart illustrating a process of deciding a priority candidate of a connection destination base station according to an exemplary embodiment. The flowchart is one in which segmentation has been performed.

A loop of M times of step S1 to step S3 illustrates a process of calculating the long-term average value of the cross-correlation power peak value of the receiving signal on all of M preamble numbers and retaining the long-term average value of the cross-correlation power peak value exceeding a base station selection threshold in a memory.

First, a cross-correlation power between a time sample of a known preamble data of a preamble number k=0 and a time sample of a receiving signal is calculated using Equation (1) described above, and the cross-correlation power is averaged for N frames (step S1). Here, N is an integer equal to or less than a calculation cycle K of the cross-correlation power. Further, since each base station BS and the relay station RS transmit the radio signals at the same frequency band, the radio signals are mixed in a space. Thus, signals from the base station BS and the relay station RS present around the wireless terminal MS are included in the time sample of the receiving signal based on the mixed radio signal. As a result, preamble data included in the time sample of the receiving signal becomes data to which a plurality of preamble data is added. However, even if a plurality of preamble data is added, the cross-correlation power can be calculated.

Next, a cross-correlation power peak value on the preamble number k=0 is detected (step S2).

Next, a cross-correlation power peak value exceeding a base station selection threshold is retained in a memory together with the preamble number (step S3).

The process of step S1 to step S3 is repeated until k=M−1. As a result, a long-term average value of the cross-correlation power peak values corresponding to the base station BS and the relay station RS present around the wireless terminal MS is obtained. That is, since different preamble numbers are allocated to the base station BS and the relay station RS that the wireless terminal MS can receive at a specific point, the number of cross-correlation power peak values equal to or more than the base station selection threshold is equal to the number of base stations BS and relay station RS present around the wireless terminal MS.

The process of step S1 to step S3 is performed by the cross-correlation power calculation processing unit 136.

Subsequently, the long-term average values of the cross-correlation power peak values exceeding the base station selection threshold are sorted in descending order of value (step S4).

Next, a standby is performed until an update timing of the base station selection candidate table 200 (step S5 and step S6).

Next, the base station selection candidate table 200 is updated (step S7).

The process of step S4 to step S7 is performed by the base station selection candidate table update processing unit 137.

Subsequently, the variation range of the long-term average value of the cross-correlation power peak value on each preamble of the base station selection candidate table 200 is recorded in the memory (step S8). As described above, the variation range of the long-term average value of the cross-correlation power peak value on each preamble of the base station selection candidate table 200 may be recorded in the base station selection candidate table 200.

Next, when ON/OFF is not recorded in the priority candidate flag in the base station selection candidate table 200, such as immediately after power is turned on, OFF is given to all flags (step S9 and step S10).

Next, it is determined whether or not it is an update timing of the priority candidate flag, and when it is determined that it is not the update timing (No in step S11), the process returns to step S1, and the long-term average value of the cross-correlation power peak value is newly calculated.

However, when it is determined that it is the update timing (Yes in step S11), the variation range of the long-term average value of the cross-correlation power peak value in the base station selection candidate table 200 is detected, and the priority candidate flag of the preamble number in which the variation range is within the threshold D_threshold is changed to ON (step S12).

The process of step S8 to step S12 is performed by the correlation power variation range detection processing unit 138.

Further, when a plurality of frequency channels is present as in FIG. 2, it is necessary to repeat the loop of M times in step S1 to step S3 as many times as the number of frequency channels to detect, and to obtain the cross-correlation power peak value of the receiving signal of each frequency channel.

Further, in the above description, the long-term average value of the cross-correlation power peak value has been obtained, but an instantaneous value may be used without calculating the long-term average value of the cross-correlation power peak value. In this case, in step S1, N=1.

A comparison example known to the inventors of the present invention will be described below.

Figure 16:
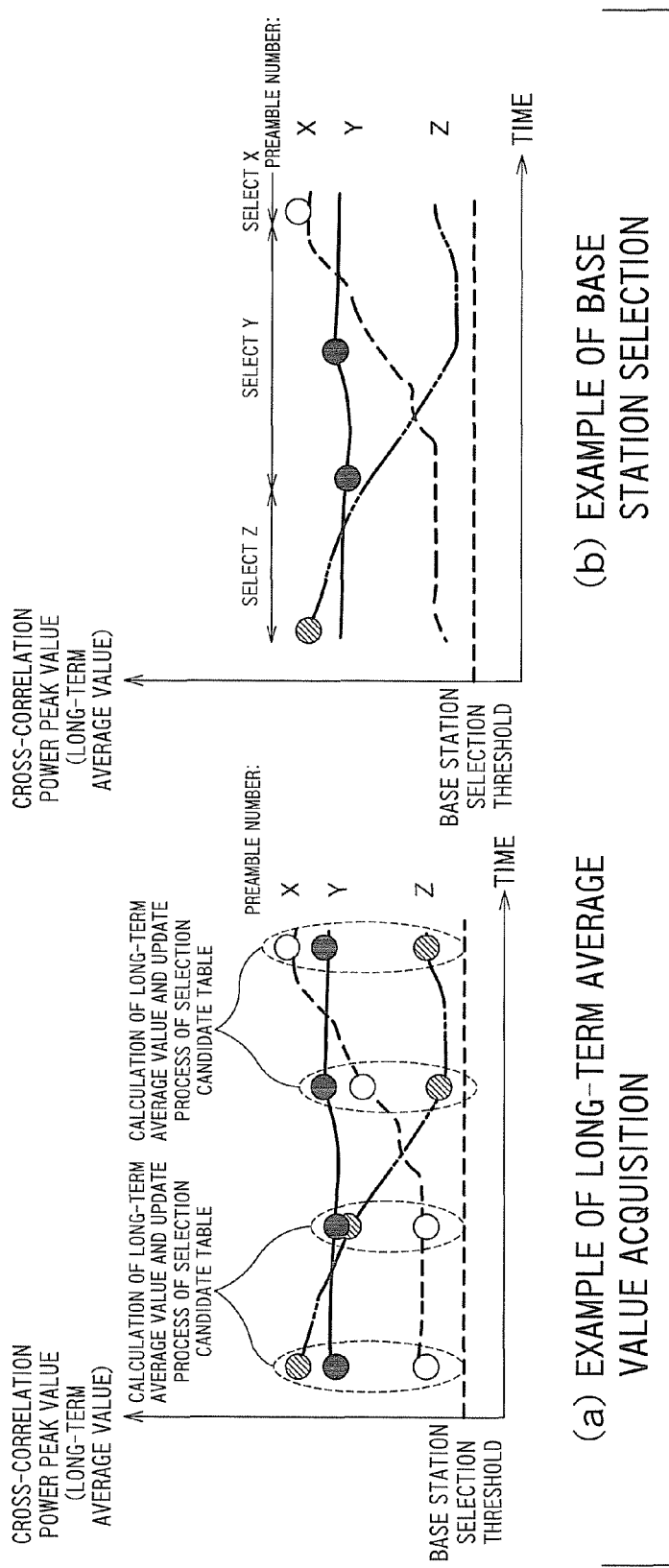
FIG. 16 is a diagram illustrating a long-term average value calculation and base station selection according to a comparison example.

FIGS. 16(*a*) and 16(*b*) illustrate an example in which the wireless terminal performs decision of the hand-off destination base station or selection of the base station at the time of communication start by periodically calculating the cross-correlation power peak value of each preamble number and selecting the preamble number having the maximum peak value. As illustrated in FIG. 16(*b*), as time elapses, the wireless terminal selects the base station corresponding to the preamble number Z, the base station corresponding to the preamble number Y, and the base station corresponding to the preamble number X in order.

Figure 17:
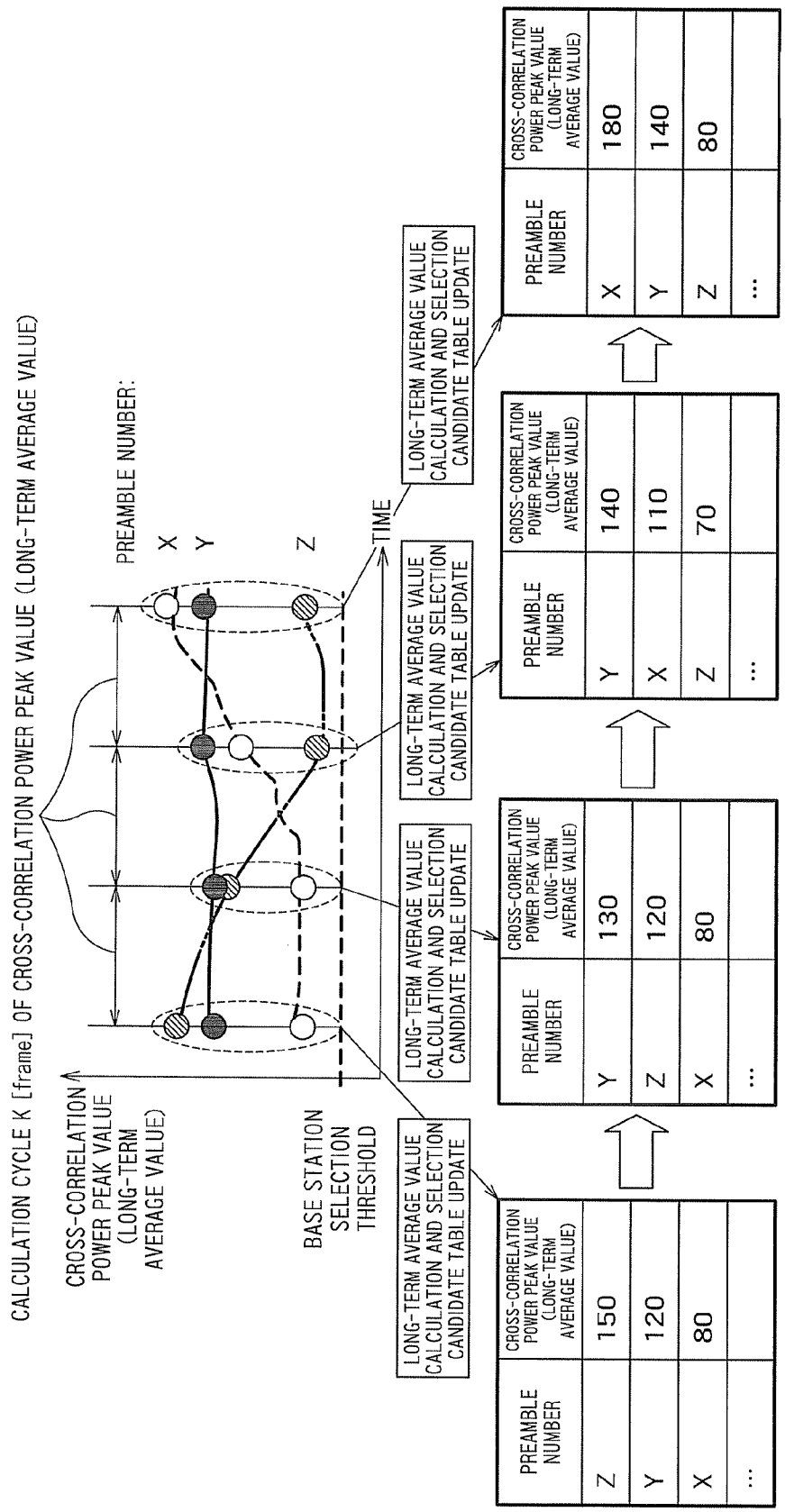
FIG. 17 is a diagram illustrating a long-term average value calculation and a base station selection candidate table according to a comparison example.

FIG. 17 illustrates an example in which the cross-correlation power peak values of all of the preamble numbers are calculated with a cycle of K frames, and the preamble numbers having the cross-correlation power peak value exceeding the base station selection threshold are recorded in the base station selection candidate table in descending order of the cross-correlation power peak value. The wireless terminal performs decision of the hand-off destination base station or selection of the base station at the time of communication start with reference to the base station selection candidate table. As described above, the wireless terminal of the comparison example selects the base station temporarily having the good quality outside the vehicle or the relay station inside the vehicle as the vehicle moves.

Compared to the comparison example, according to the present embodiment, when the vehicle 20 inside which the wireless terminal MS is present moves, the cross-correlation power peak value corresponding to the base station BS outside the vehicle 20 has the large variation range, and the cross-correlation power peak value corresponding to the relay station RS has the small variation range. Thus, by appropriately setting the threshold D_threshold of the variation range, the wireless terminal MS can continuously be connected with the relay station MS inside the vehicle 20.

According to the exemplary embodiments described above, the semiconductor device, the wireless terminal device, and the wireless communication system in which an unnecessary hand-off process can be reduced can be provided.

The exemplary embodiments of the present invention have been described above in detail, but a concrete configuration is not limited to the above exemplary embodiments, and various modifications can be made without departing from the scope of the present invention.

For example, the exemplary embodiments have been described in connection with the mobile WiMAX system as an example, but the exemplary embodiments can be applied to a system of any communication standard, if the system can discriminate the amplitude of power from each base station and the relay station.

Further, the variation range of power may be calculated using a method other than the method described in the exemplary embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor device, comprising:
  a wireless station selection unit configured to select a connection destination wireless station from among a plurality of wireless stations,
  wherein the wireless station selection unit comprises:
    a power calculation processing unit configured to calculate power values for respective receiving signals from the plurality of wireless stations,
    a storage unit configured to store a table, wherein a subset of the power values that are equal to or greater than a defined threshold are recorded in the table in association with a subset of the wireless stations respectively corresponding to the subset of the power values,
    a table update processing unit configured to update the table at a defined timing interval, and
    a power variation range detection processing unit configured to determine respective variation ranges of the subset of the power values for the subset of the wireless stations with reference to the table and to set a wireless station, of the subset of the wireless stations, having a variation range, of the variation ranges, that is within a defined range as a priority candidate of the connection destination wireless station.

2. The semiconductor device according to claim 1, wherein the wireless station selection unit is further configured to select the priority candidate, from a plurality of priority candidates, as the connection destination wireless station based on the priority candidate having a highest power value of the plurality of priority candidates.

3. The semiconductor device according to claim 1, wherein the wireless station selection unit is further configured to, in response to the priority candidate not being present, select a wireless station having a highest power value of the subset of the wireless stations as the connection destination wireless station.

4. The semiconductor device according to claim 1, wherein the wireless station selection unit further comprises a preamble data retention unit configured to store a plurality of known preamble data items,
  wherein the known preamble data items are respectively associated with the receiving signals from the plurality of wireless stations, and
  the power calculation processing unit is further configured to calculate cross-correlation power values between the receiving signals and the plurality of known preamble data values, respectively, set a cross-correlation power, of the cross-correlation power values, equal to or greater than the defined threshold as a power value, and specify a preamble data item, of the known preamble data items, from which the cross-correlation power equal to or greater than the threshold has been obtained.

5. The semiconductor device according to claim 1, wherein the power calculation processing unit is further configured to average the power values of the respective receiving signals during a first period and calculate average power values of the respective receiving signals, and store the average power values in place of the power values in the table in association with the subset of the plurality of wireless stations, and
  the power variation range detection processing unit is further configured to select a wireless station, of the subset of the plurality of wireless stations, average power value, of the average power valves, that is within the predetermined range during a second period as the priority candidate, the second period being longer than the first period.

6. The semiconductor device according to claim 5, wherein the first period is between 50 milliseconds and 100 milliseconds.

7. The semiconductor device according to claim 1, wherein the plurality of wireless stations comprise a plurality of base stations and a relay station, and
  the relay station is installed in a mobile body.

8. A wireless terminal device configured to connect to a connection destination wireless station selected from among a plurality of wireless stations to perform wireless communication, comprising:
  a wireless processing unit configured to transmit or receive a radio signal to or from the plurality of wireless stations; and
  a signal processing unit configured to perform a signal process as the radio signal is transmitted or received,
  wherein the signal processing unit comprises a wireless station selection unit configured to select the connection destination wireless station, and
  the wireless station selection unit comprises:
    a power calculation processing unit configured to calculate power values of respective receiving signals from the plurality of wireless stations,
    a storage unit configured to store, in a table, a subset of the power values that are equal to or greater than a defined threshold, wherein the storage unit is further configured to record the subset of the power values in association with a corresponding subset of the plurality of wireless stations,
    a table update processing unit configured to update the table at a defined timing interval, and
    a power variation range detection processing unit configured to detect respective variation ranges of the subset of the power values with reference to the table and to set a wireless station, of the subset of the plurality of wireless stations, corresponding to a variation range, of the variation ranges, that is within a defined range as a priority candidate for the connection destination wireless station.

9. The wireless terminal device, according to claim 8, wherein the priority candidate is one of a plurality of priority candidates, and the wireless station selection unit is further configured to select one of the plurality of priority candidates having a highest power as the connection destination wireless station.

10. The wireless terminal device according to claim 8, wherein the wireless station selection unit is further configured to, in response to a determination that none of the subset of the plurality of wireless stations qualify as the priority candidate, select a wireless station, of the subset of the plurality of wireless stations, having a highest power as the connection destination wireless station.

11. The wireless terminal device according to claim 8,
wherein the wireless station selection unit further comprises a preamble data retention unit configured to store a plurality of preamble data sets,
the plurality of preamble data sets respectively associated with the receiving signals from the plurality of wireless stations, and
the power calculation processing unit is further configured to calculate respective cross-correlation power values between the receiving signals and the plurality of preamble data sets, set a subset of the cross-correlation power values that are equal to or greater than the defined threshold as the power values, and specify a corresponding subset of the preamble data sets from which the cross-correlation power values that are equal to or greater than the defined threshold have been obtained.

12. The wireless terminal device according to claim 8,
wherein the power calculation processing unit is further configured to average the power values of the respective receiving signals during a first period to yield average power values of the respective receiving signals, and to store the average power values, instead of the power values, in the table in association with the subset of the plurality of wireless stations, and
wherein the power variation range detection processing unit is further configured to select a wireless station, of the subset of the plurality of wireless stations, corresponding to an average power value, of the average power values, that is within the defined range during a second period as the priority candidate, the second period being longer than the first period.

13. The wireless terminal device according to claim 8,
wherein the plurality of wireless stations comprise a plurality of base stations and a relay station, and
the relay station is installed in a mobile body.

14. A wireless communication system, comprising:
a plurality of wireless stations; and
a wireless terminal device configured to connect to a connection destination wireless station selected from among the plurality of wireless stations to perform wireless communication,
wherein the wireless terminal device comprises:
a wireless processing unit configured to at least one of transmit or receive a radio signal to or from the plurality of wireless stations, and
a signal processing unit configured to perform a signal process based on the radio signal,
wherein the signal processing unit comprises a wireless station selection unit configured to select the connection destination wireless station, and
the wireless station selection unit comprises:
a power calculation processing unit configured to calculate power values of respective receiving signals from the plurality of wireless stations,
a storage unit configured to record, in a table, a subset of the power values that are equal to or greater than a threshold in association with a corresponding subset of the plurality of wireless stations,
a table update processing unit configured to update the table at a defined timing interval, and
a power variation range detection processing unit configured to determine respective variation ranges of the subset of the power values with reference to the table and to set a wireless station, of the subset of the plurality of wireless stations, corresponding to a variation range, of the variation ranges, that is within a defined range as a priority candidate.

15. The wireless communication system according to claim 14,
wherein the priority candidate is one of multiple priority candidates, and the wireless station selection unit is further configured to select one of the multiple priority candidates having a highest power value as the connection destination wireless station.

16. The wireless communication system according to claim 14,
wherein the wireless station selection unit is further configured to, in response to a determination that none of the subset of the plurality of wireless stations are a priority candidate, select a wireless station, of the subset of the plurality of wireless stations, having a highest power value as the connection destination wireless station.

17. The wireless communication system according to claim 14,
wherein the wireless station selection unit further comprises a preamble data retention unit configured to store a plurality of preamble data items, respectively associated with the receiving signals from the plurality of wireless stations, and
the power calculation processing unit is further configured to calculate respective cross-correlation power values between the receiving signals and the plurality of preamble data items, set a subset of the cross-correlation power values that are equal to or greater than the threshold as the power values, and specify a subset of the preamble data values from which the subset of the cross-correlation power values that are equal to or greater than the threshold have been obtained.

18. The wireless communication system according to claim 14,
wherein the power calculation processing unit is further configured to average the power values of the respective receiving signals during a first period to determine average power values of the respective receiving signals, and store the average power values, instead of the power values, in the table in association with the corresponding subset of the plurality of wireless stations, and
the power variation range detection processing unit is further configured to select a wireless station, of the subset of the plurality of wireless stations, corresponding to an average power value, of the average power values, having a variation range that is within the defined range during a second period as the priority candidate, the second period being longer than the first period.

19. The wireless communication system according to claim 14,
wherein the plurality of wireless stations comprise a plurality of base stations and a relay station, and
the relay station is installed in a mobile body.

20. The wireless communication system according to claim 14,
wherein the wireless terminal device is further configured to perform the wireless communication according to a mobile worldwide interoperability for microwave access (WiMAX) standard.

* * * * *